United States Patent
Ochoa

(12)
(10) Patent No.: US 6,205,911 B1
(45) Date of Patent: Mar. 27, 2001

(54) TOASTING APPARATUS

(76) Inventor: Emilio Ochoa, 5502 Cooper Ct., Hanover Park, IL (US) 60103

( * ) Notice: Subject to any disclaimer, the term of this patent is extended or adjusted under 35 U.S.C. 154(b) by 0 days.

(21) Appl. No.: 09/573,512

(22) Filed: May 18, 2000

(51) Int. Cl.[7] .......................... A47J 37/00; A47J 37/08
(52) U.S. Cl. ............................. 99/331; 99/349; 99/378; 99/385; 99/389; 99/390; 99/391; 99/448
(58) Field of Search ........................... 99/325–333, 340, 99/339, 349, 378–385, 389–402, 427, 448, 444–446; 219/492, 497, 521, 501, 476–478, 385, 386

(56) References Cited

U.S. PATENT DOCUMENTS

| | | | |
|---|---|---|---|
| D. 125,684 | 3/1941 | Edelman . | |
| D. 147,734 | 10/1947 | Musser | D81/10 |
| D. 149,937 | 6/1948 | Dailey | D81/10 |
| D. 161,265 | 3/1950 | Jepson | D81/10 |
| D. 232,210 | 7/1974 | Hentschel | D7/93 |
| D. 312,943 | 12/1990 | Sanchez | D7/330 |
| D. 336,402 | 6/1993 | Del Fresno | D7/330 |
| D. 384,541 | 10/1997 | Angarita | D7/330 |
| D. 401,472 | 11/1998 | Gould | D7/330 |
| 1,697,914 * | 1/1929 | Hummel et al. | 99/327 |
| 2,038,028 * | 4/1936 | De Mattels | 99/386 |
| 2,182,229 * | 12/1939 | Hamel | 99/386 |
| 2,387,817 | 10/1945 | Wales | 99/327 |
| 2,536,776 | 1/1951 | Smellie | 99/385 |
| 2,562,535 | 7/1951 | Leonard | 99/331 |
| 2,644,392 | 7/1953 | Foster | 99/329 |
| 2,693,751 | 11/1954 | Allen | 99/339 |
| 2,714,348 * | 8/1955 | Fokakis | 99/387 |
| 2,928,524 * | 3/1960 | Jensen | 99/386 X |
| 2,948,404 * | 8/1960 | Harrod | 99/326 X |
| 3,220,336 * | 11/1965 | Hoover | 99/443 C |
| 3,277,813 * | 10/1966 | Luscher | 99/386 |
| 3,418,920 * | 12/1968 | Alexander | 99/443 C |
| 3,659,518 * | 5/1972 | Porter | 99/386 |
| 3,869,969 * | 3/1975 | Sharp | 99/327 |
| 3,941,044 | 3/1976 | Goltsos | 99/391 |
| 4,970,949 | 11/1990 | Ferrara, Jr. et al. | 99/374 |
| 4,976,195 | 12/1990 | Cavazos | 99/391 |
| 5,309,826 | 5/1994 | Oritz | 99/391 |
| 5,584,231 * | 12/1996 | DeLeon | 99/332 |
| 5,590,584 | 1/1997 | Ahn | 99/327 |
| 5,765,471 * | 6/1998 | Monard | 99/448 |

* cited by examiner

Primary Examiner—Timothy F. Simone
(74) Attorney, Agent, or Firm—Marshall, O'Toole, Gerstein, Murray & Borun

(57) ABSTRACT

A toasting apparatus is provided which includes a housing, a base having first and second side walls and a plurality of slots disposed within the housing at an angle less than about 45° from top planar surfaces of the first and second side walls of the base. Each slot has a width less than about 0.5 inches (about 1.27 cm).

20 Claims, 6 Drawing Sheets

TOASTING APPARATUS

TECHNICAL FIELD

The present invention relates generally to electric appliances, and more specifically, to an electric toasting apparatus.

BACKGROUND OF THE ART

Ordinarily, a toaster or other similar device is used to warm or toast food such as a baked good, e.g., a slice of bread. Typically, the toaster includes a housing portion having at least one slot for receiving the baked good and a heating element disposed within the housing adjacent to the slot or slots to warm or toast the baked good. Each slot is typically rectangularly shaped and wide enough to accommodate a relatively small variety of baked goods, such as a slice of bread or a bagel, for example.

Some baked goods, however, do not adequately fit within the slots provided in a conventional toaster and therefore are not toasted properly. For example, a tortilla or other similarly thin-shaped baked good may not be toasted using the conventional toaster because the slots of the conventional toaster are too wide for the tortilla or other similarly thin-shaped baked good, thereby causing the tortilla to fold over in the slot. This in turn results in the uneven heating or misshaping of the tortilla. In addition, some toaster slots are not long enough to accommodate the size of most tortillas or other similarly shaped baked goods, and therefore the tortillas must be folded or bent to fit entirely inside the slot. This also results in the uneven heating of the baked good.

SUMMARY OF THE INVENTION

The present invention is directed to a toasting apparatus.

More particularly, in accordance with one aspect of the present invention, a toasting apparatus comprises a housing, a base having a first side wall and a second side wall, wherein each side wall includes a top planar surface, and a plurality of slots disposed within the housing at an angle less than 45° from the top planar surfaces of the first and second side walls of the base. Each slot has a width less than about 0.5 inches (about 1.27 cm).

In accordance with one aspect of the present invention, each slot may further have a length greater than about 6.0 inches (about 1.27 cm). The housing may further include a front wall, a back wall and a top portion disposed between the front and back walls. The top portion may be substantially cylindrical in shape.

More particularly, each slot of the apparatus may further include a slot opening, which may be substantially curved or substantially straight. The slot openings are preferably disposed on the top portion of the housing.

Preferably, the housing may further include a handle for operating the toasting apparatus, such that after the handle is manually moved in a first direction it automatically moves in a second direction opposite the first direction after a predetermined amount of time.

The housing may also include a dial for setting a level of heat to be applied by a plurality of heating elements.

In accordance with another aspect of the present invention, a toasting apparatus comprises a housing, a base having a first side wall and a second side wall, wherein each side wall includes a top planar surface and a plurality of slots disposed at an angle less than about 45° from the top planar surfaces of the first and second side walls of the base. Each slot has a length greater than about 6 inches (15.24 cm).

In accordance with another aspect of the present invention, a toasting apparatus comprises a housing, a base having a first side wall and a second side wall, wherein each side wall includes a top planar surface and a plurality of slots disposed at an angle less than about 45° from the top planar surfaces of the first and second side walls of the base. Each slot has a width less than about 0.5 inches (1.27 cm) and a tray disposed within the housing portion.

DESCRIPTION OF THE PREFERRED EMBODIMENT

Figure 1:
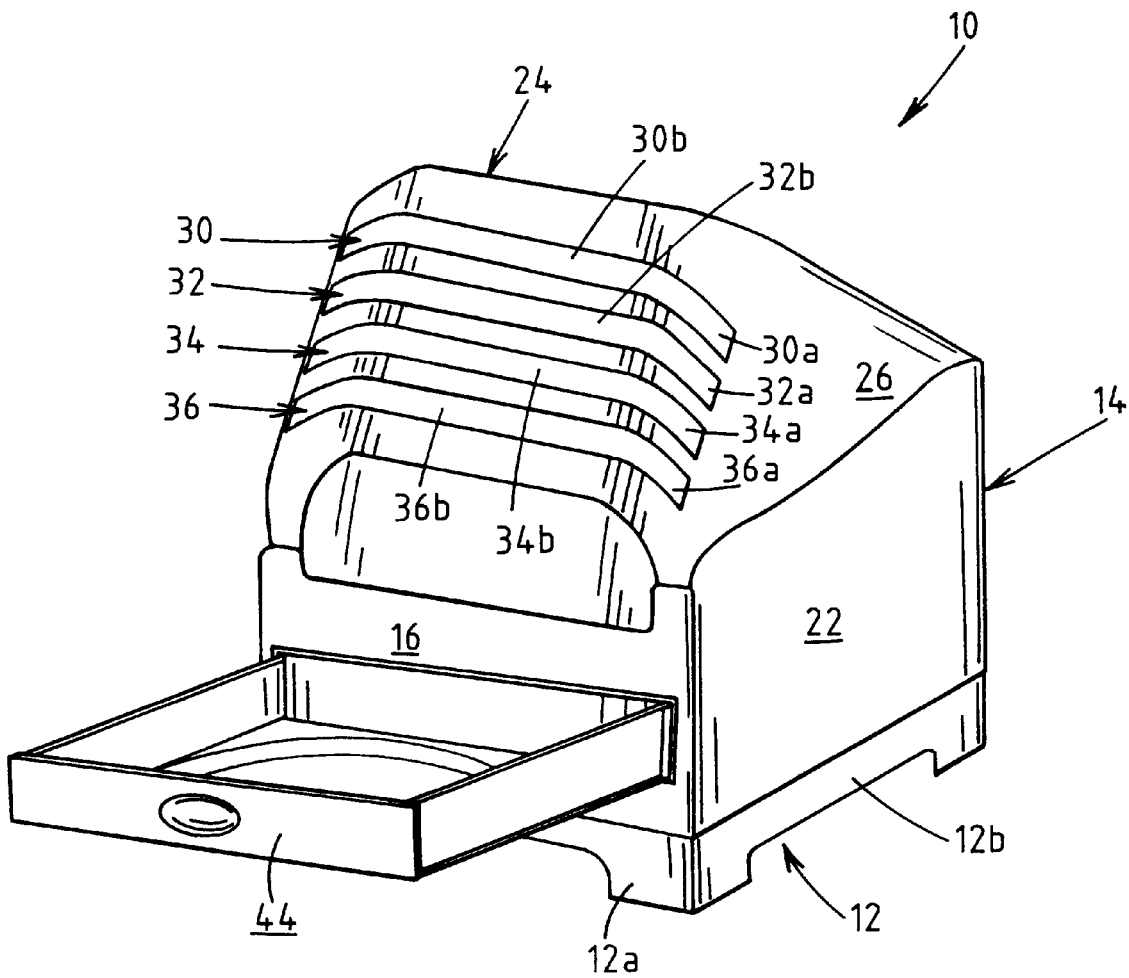
FIG. 1 is a perspective view of a toasting apparatus according to the present invention.
Figure 2:
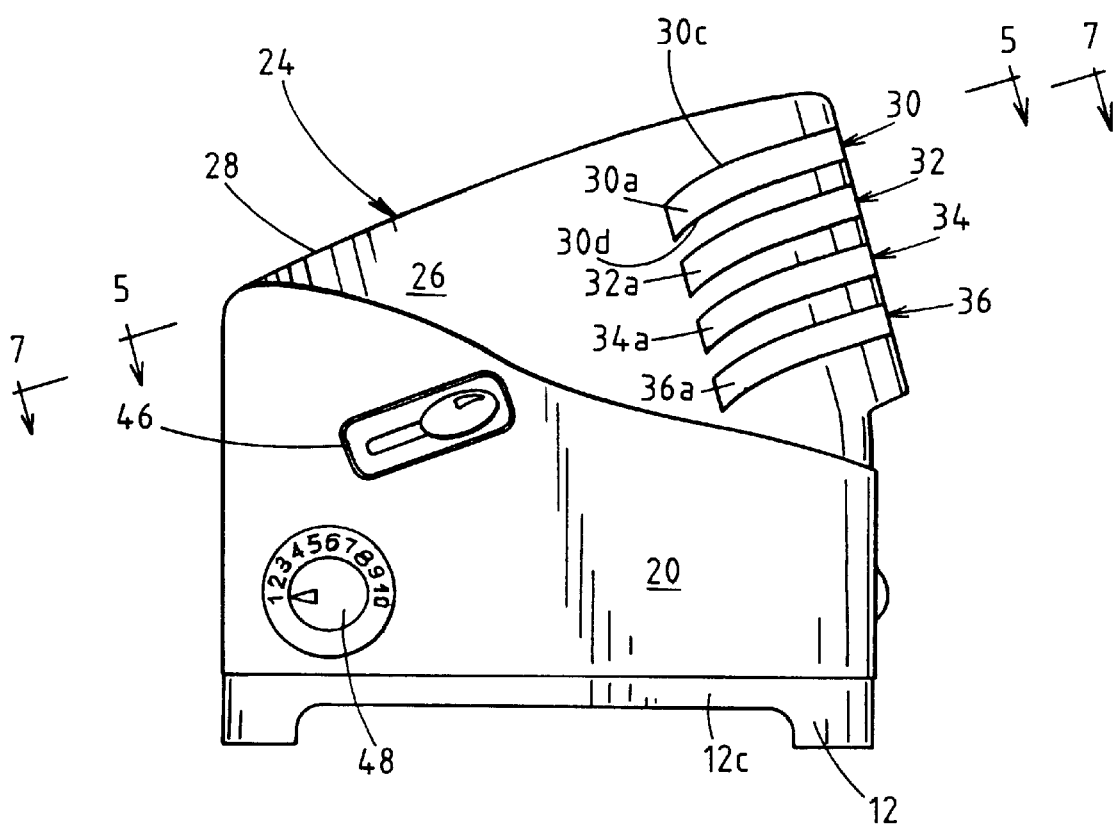
FIG. 2 is a side elevational view of the toasting apparatus of the present invention.
Figure 3:
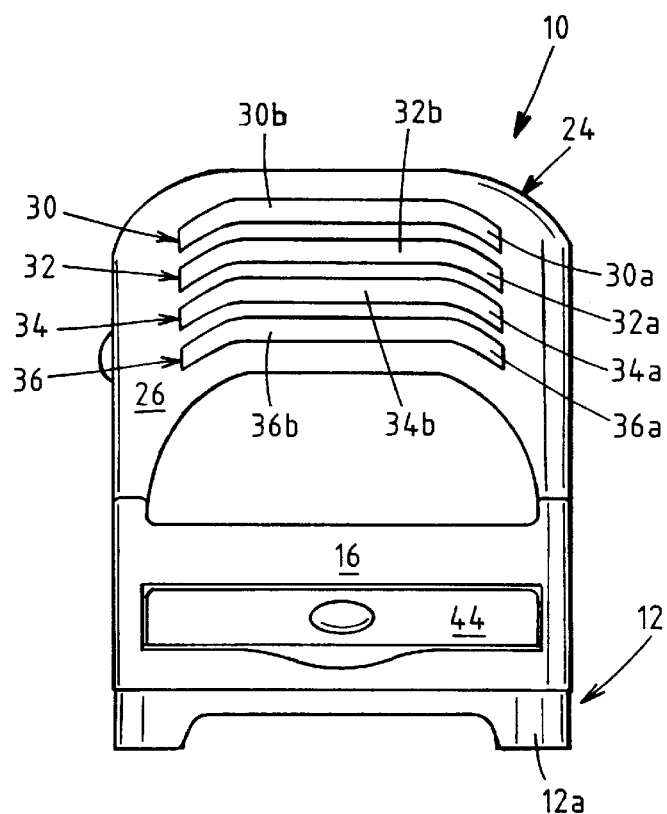
FIG. 3 is a front elevational view of the toasting apparatus of the present invention.
Figure 4:
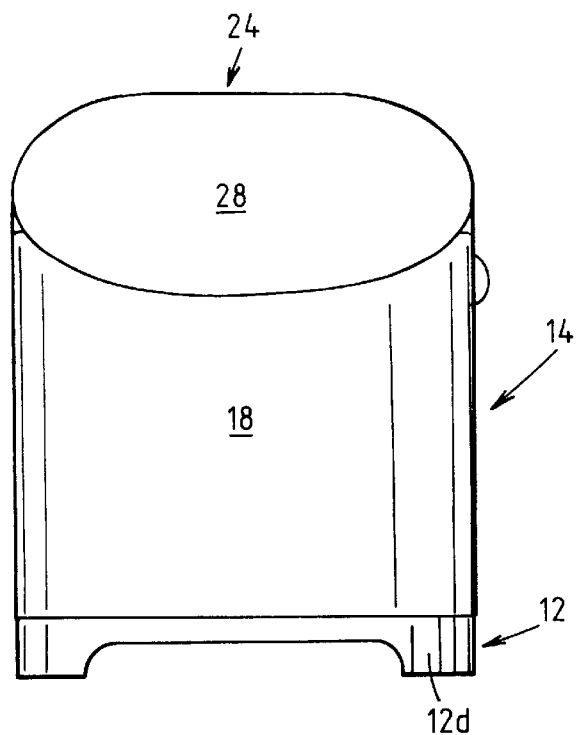
FIG. 4 is a back elevational view of the toasting apparatus according to the first embodiment of the present invention.

Referring now to FIGS. 1–4, a first embodiment of a toasting apparatus 10 of the present invention is shown. As shown in FIG. 1, the toasting apparatus 10 includes a base 12, having a generally planar top surface, a front wall 12a, a first side wall 12b, a second side wall 12c, and a back wall 12d. The toasting apparatus 10 further includes a housing 14 typically disposed adjacent to (e.g., on top of) the base 12. The housing 14 also includes a front wall 16, a back wall 18 opposite the front wall 16, a first side wall 20 and a second side wall 22 opposite the wall 20. The housing 14 further includes a top portion 24 disposed between both the front and back walls 16 and 18 and first and second side walls 20, 22. The top portion 24 may include a curved front wall 26 and a top wall 28 (shown in FIG. 4). The top portion 24 may have the general shape of a partial cylinder as best shown in FIGS. 2 and 4. It should be noted that the top portion 24 may be one of many shapes different from that shown therein, including a one-sided, generally planar wall.

The top wall 28 is preferably disposed at an angle less than about 45 degrees from top planar surfaces of the first and second side walls 12b, 12c of the toasting apparatus 10. For example, in the embodiment shown, the top wall 28 is at an angle less than about 45 degrees from the horizon, since the top surfaces of the side walls 12b and 12c are parallel to the horizon, or a flat surface on which apparatus 10 rests. The top wall 28 may be disposed at an angle less than about 25 degrees from the top surfaces of the first and second side walls 12b, 12c. It should be understood that the base 12 could be integral with the housing 14; in this case the referred-to angles can be measured based on a flat surface upon which the apparatus 10 is placed.

As shown in FIGS. 1–3, the top portion 24 further includes a plurality of slots 30, 32, 34 and 36 for receiving a tortilla or other similarly shaped baked good. Slots 30, 32, 34 and 36 have slot openings or apertures 30a, 32a, 34a and 36a, respectively. As shown in FIG. 2, each slot is defined by a plurality of slot walls. For example, for slot 30, walls including top wall 30c and bottom wall 30d define a volume having a generally circular cross section. The walls 30b and 30c (as well as the volume of slot 30) are preferably disposed at an angle less than about 45 degrees from the top surfaces of the first and second side walls 12b, 12c. For example (like the top wall 28 of the top portion 24 of the toasting apparatus 10 in which the slots 30, 32, 34 and 36 are disposed), the slots 30, 32, 34 and 36 (as well as their defining top and bottom walls) may be disposed at an angle less than about 25 degrees from the top surfaces of the first and second side walls 12b, 12c.

Figure 5:
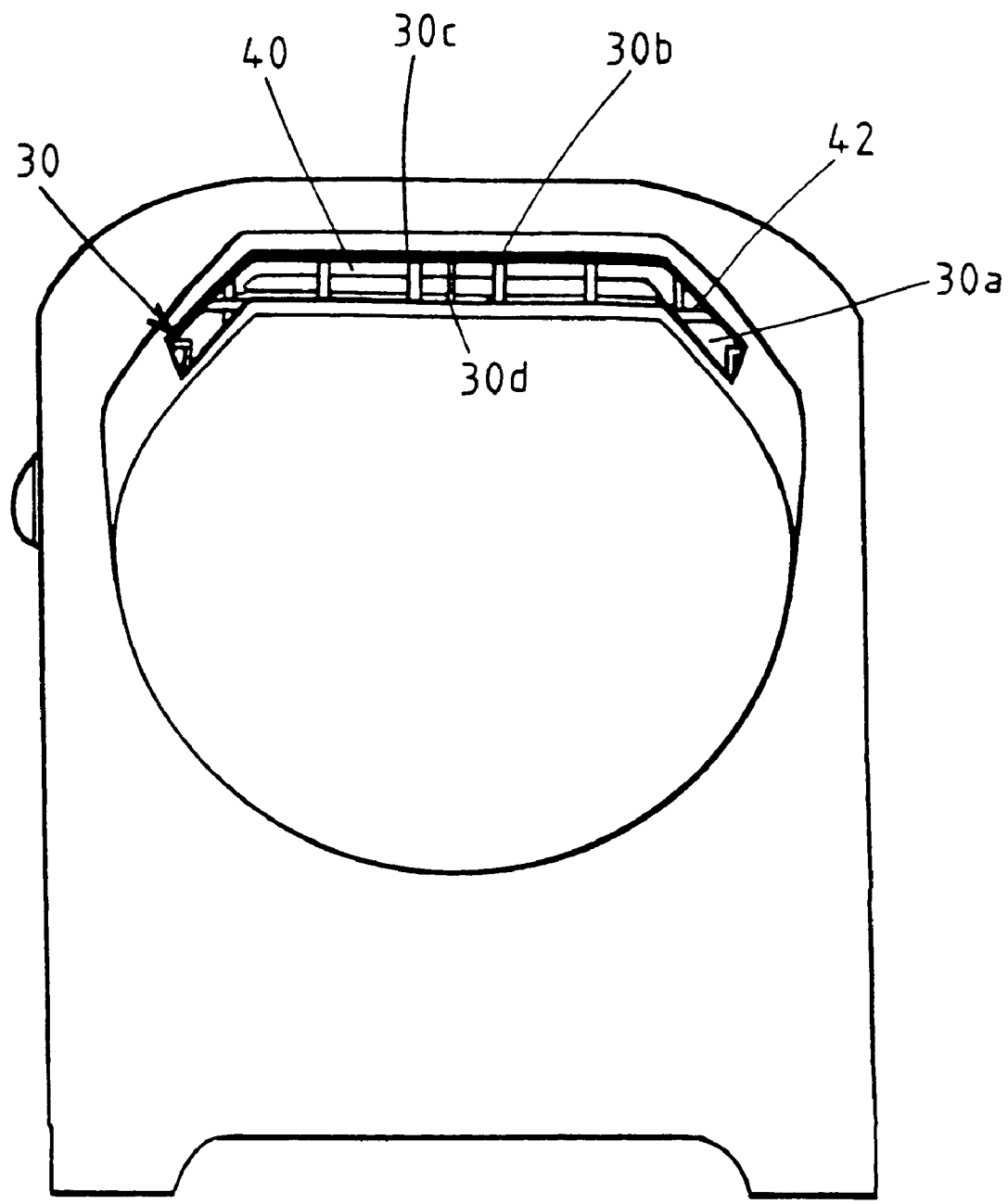
FIG. 5 is a sectional view of the toasting apparatus taken generally along the line 5—5 of FIG. 2.

The slots 30, 32, 34 and 36 may be any size and shape which adequately accommodates tortillas and the like. For example, the slots 30, 32, 34 and 36 may be partially circular in a cross section taken along the line 5—5 in FIG. 2 (e.g., the line in which the tortilla is inserted into the slot), as shown in FIG. 5 and further shown in Monard U.S. Pat. No. 5,765,471, and DeLeon U.S. Pat. No. 5,584,231. Alternatively, the slots can be rectangular in cross-section taken in the same direction (not shown), as in a conventional toasting apparatus.

The slot openings 30a, 32a, 34a and 36a may have one of a variety of configurations, for example, the openings may be partially curved and may further have a portion 30b, 32b, 34b and 36b that is straight (as best shown in FIGS. 1, 3 and 5), which enables the tortillas to be easily removed from the slots 30, 32, 34 and 36 after toasting is complete. Alternatively, the slot openings 30a, 32a, 34a and 36a could be curved over their entire length, for example, as shown in DeLeon U.S. Pat. No. 5,584,231.

The slot openings 30a, 32a, 34a and 36a preferably have an overall length greater than about 6 inches (about 15.42 cm), thereby allowing larger tortillas and other goods to fit entirely within the slots 30, 32, 34 and 36 without bending or folding. In addition, the slot openings 30a, 32a, 34a and 36a preferably have a width that is less than about 0.5 inches (about 1.27 cm), thereby allowing thin tortillas to fit within the slots 26 without bending or folding.

Figure 6A:
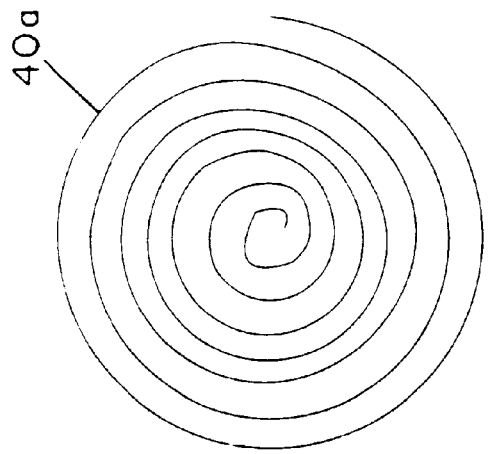
FIGS. 6a–6c are elevational views of heating elements associated with the toasting apparatus of the present invention.
Figure 6B:
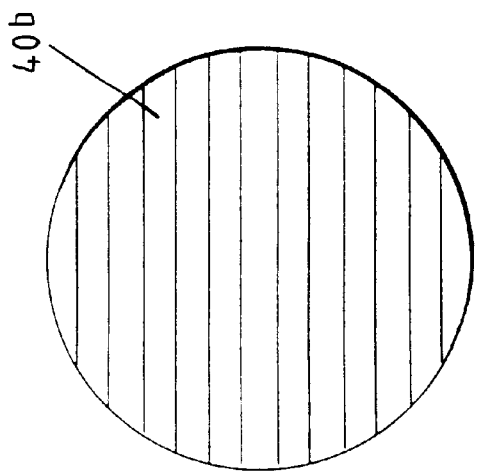
Figure 6C:
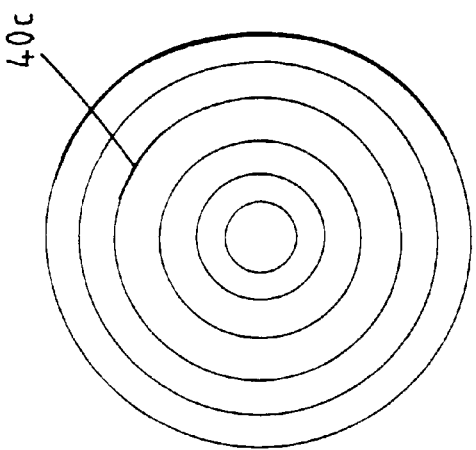

Like conventional toasters, the toasting apparatus 10 further includes a plurality of heating elements. Typically, one heating element is disposed on either side (e.g., top and bottom) of each slot 30, 32, 34 and 36 and may comprise a coil 40 having a pattern, such as a spiral pattern 40a, as shown in FIG. 6a, a rectangular pattern 40b, as shown in FIGS. 5, 6b and 7, or a circular pattern 40c, as shown in FIG. 6c.

Figure 7:
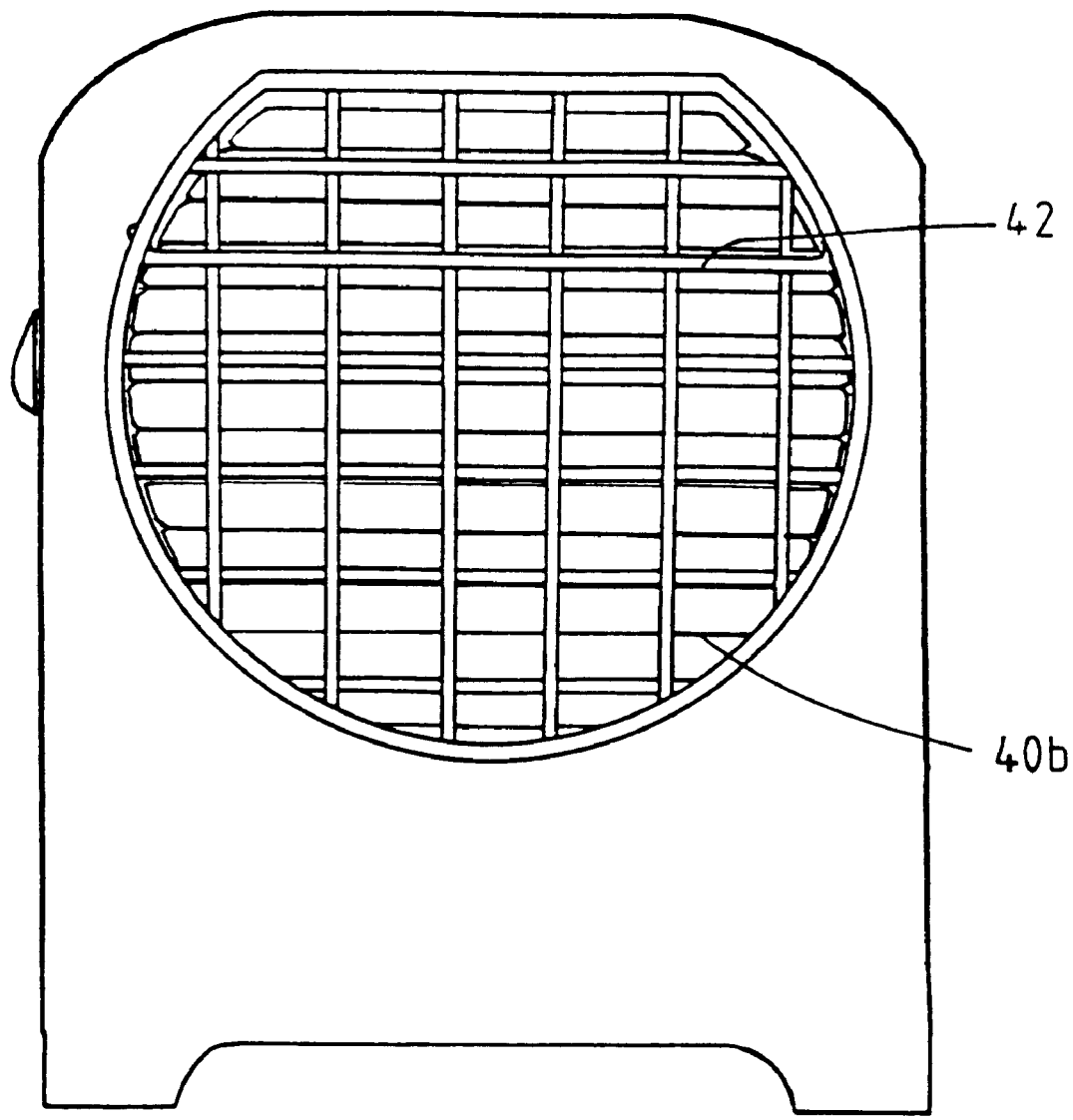
FIG. 7 is a sectional view of the toasting apparatus taken generally along the line 7—7 of FIG. 2.

As shown in FIGS. 5 and 7, the toasting apparatus 10 may also include a plurality of screens, wherein each screen 42 is typically disposed between each heating element and the wall defining slot 30, 32, 34 or 36 (e.g., walls 30c and 30d). The screens 42 are preferably positioned so that the tortilla or other baked good placed within each slot 30, 32, 34 and 36 is at an equal distance from each heating element associated with each slot, regardless of the angle at which the slots 30, 32, 34 and 36 are disposed on the top portion 24 (or at which the top portion 24 is disposed), thereby preventing one side of the tortilla from being exposed to more heat than the opposite side of the tortilla.

As shown in FIGS. 1–3, the toasting apparatus 10 may further include an optional tray 44 removably disposed within the housing 14 for receiving a tortilla or other good. As shown in FIG. 1, for example, the tray 44 is disposed on the front wall 16 of the housing 14. The tray 44 should be capable of holding a plurality of tortillas, and is preferably detachable from the toasting apparatus 10 for serving and cleaning. By being positioned on the front wall 16 of the housing 14, the tray 44 is disposed below the slots 30, 32, 34 and 36. Thus, once the tortillas or other baked goods have been toasted, they may be easily and quickly removed from the slots 30, 32, 34 and 36 and put into the tray 44 for temporary storage while additional tortillas are heated or other food is prepared. The hot tortillas or baked goods therefore need be touched by the hand only momentarily.

Like most conventional toasters, the toasting apparatus 10 further includes a heat-resistant handle 46 disposed on the housing portion 14 for operating the toasting apparatus. The handle 46 may be disposed on the first side wall 20 of the housing 14, as shown in FIG. 2, and is typically spring-loaded. To begin the process of heating or toasting the tortilla or other baked good, a user moves the handle 46 in a first direction. After a predetermined amount of time, the handle 46 automatically moves in a second direction opposite the first by the force of a spring or other known expedient. Those of skill in the art will be able to select from various known timing expedients.

The toasting apparatus 10 further includes a heat-resistant dial 48 disposed on the housing 14 for setting a level of heat to be applied by the heating elements, or to regulate the amount of time that heat is applied before the handle 46 is triggered.

While the present invention has been described with reference to specific examples, which are intended to be illustrative only, and not to be limiting of the invention, it will be apparent to those of ordinary skill in the art that changes, additions and/or deletions may be made to the disclosed embodiments without departing from the spirit and scope of the invention. For example, although the invention is described as useful with tortillas, it may also be used to heat or toast other types of bread and foods, for example pita bread, crepes or pancakes.

What is claimed is:

1. A toasting apparatus, comprising:
   a housing;
   a base having a first side wall and a second side wall, wherein each side wall includes a top planar surface; and
   a plurality of slots disposed within the housing at an angle less than 45° from the top planar surfaces of the first and second side walls of the base, wherein each slot has a width less than about 0.5 inches (about 1.27 cm).

2. The apparatus of claim 1, wherein each slot has a length greater than about 6.0 inches (about 15.24 cm).

3. The apparatus of claim 1, wherein the housing includes a front wall, a back wall opposite the front wall and a top portion disposed between the back and front walls.

4. The apparatus of claim 3, wherein the top portion is substantially cylindrical in shape.

5. The apparatus of claim 3, wherein each slot includes a slot opening.

6. The apparatus of claim 5, wherein each slot opening is substantially curved.

7. The apparatus of claim 5, wherein each slot opening is substantially straight.

8. The apparatus of claim 5, wherein the slot openings are disposed on the top portion of the housing.

9. The apparatus of claim 1, wherein the housing includes a handle for operating the toasting apparatus, such that after the handle is manually moved in a first direction it automatically moves in a second direction opposite the first direction after a predetermined period of time.

10. The apparatus of claim 1, wherein the housing includes a dial for setting a level of heat to be applied by a plurality of heating elements.

11. A toasting apparatus, comprising:

a housing;

a base having a first side wall and a second side wall, wherein each side wall includes a top planar surface; and a plurality of slots disposed within the housing at an angle less than about 45° from the top planar surfaces of the first and second side walls of the base, wherein each slot has a length greater than about 6.0 inches (about 15.24 cm).

12. The apparatus of claim 11, wherein each slot has a width less than about 0.5 inches (about 1.27 cm).

13. The apparatus of claim 11, wherein the housing includes a front wall, a back wall opposite the front wall and a top portion disposed between the front and back walls.

14. The apparatus of claim 13, wherein each slot includes a slot opening.

15. The apparatus of claim 14, wherein each slot opening is disposed on the top portion of the housing.

16. A toasting apparatus, comprising:

a housing;

a base having a first side wall and a second side wall, wherein each side wall includes a top planar surface; and a plurality of slots disposed within the housing at an angle less than about 45° from the top planar surfaces of the first and second side walls of the base, wherein each slot has a width less than about 0.5 inches (1.27 cm); and a tray disposed within the housing.

17. The toasting apparatus of claim 16, wherein each slot has a length greater than about 6.0 inches (about 15.24 cm).

18. The apparatus of claim 16, wherein the housing includes a front wall, a back wall opposite the front wall, and a top portion disposed between the front and back walls.

19. The apparatus of claim 18, wherein each slot includes a slot opening and each slot opening is disposed on the top portion of the housing.

20. The apparatus of claim 16, wherein the tray is removably disposed on a front wall of the housing portion.

* * * * *